(12) United States Patent
Rittmueller

(10) Patent No.: US 8,271,709 B2
(45) Date of Patent: Sep. 18, 2012

(54) BUS PROTOCOL FOR CONTROL OF COMMUNICATIONS BETWEEN TWO COMPUTERS

(75) Inventor: Joel Rittmueller, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 587 days.

(21) Appl. No.: 12/463,807

(22) Filed: May 11, 2009

(65) Prior Publication Data

US 2010/0287316 A1 Nov. 11, 2010

(51) Int. Cl.
G06F 13/42 (2006.01)
G06F 13/00 (2006.01)
G06F 12/00 (2006.01)

(52) U.S. Cl. .................. 710/106; 710/107; 710/200

(58) Field of Classification Search .............. 710/106, 710/107, 200
See application file for complete search history.

(56) References Cited

U.S. PATENT DOCUMENTS

| | | | |
|---|---|---|---|
| 4,280,221 A * | 7/1981 | Chun et al. ........... | 375/288 |
| 6,173,159 B1 | 1/2001 | Wright et al. | |
| 6,317,659 B1 | 11/2001 | Lindsley et al. | |
| 6,353,734 B1 | 3/2002 | Wright et al. | |
| 6,493,775 B2 * | 12/2002 | Yamazaki et al. ........ | 710/107 |
| 6,816,762 B2 | 11/2004 | Hensey et al. | |
| 7,356,389 B2 | 4/2008 | Holst et al. | |
| 7,398,057 B2 | 7/2008 | Stefani et al. | |

OTHER PUBLICATIONS

, "ARINC Specification 429", "available at http://www.arinc.com", Oct. 2001, pp. 13-74, Publisher: ARINC.
, "5.5.3 Process Calibration ARINC 429 Input Data", "B747-400 WBS Software Requirements Documents—C72-3740-033", Nov. 2002, pp. 5.5-15 thru 5.5-17.
, "5.7.1.3 Receive and Decode Calibration Data", "B747-400 WBS Software Requirements Documents C72-3740-033", 11-2002, pp. 5.7-7 thru 5.7-8.
, "A.5.2 Calibration Bus Data", "B747-400 WBS Software Requirements Document C72-3740-033", Nov. 2002.
, "Honeywell Weight and Balance System", Nov. 2002, Publisher: Comlink Pacific Avionics.
, "PC Calibration", Jan. 13, 1992.
, "8.1 Process Calibration Data", "747-400 WBC HW/SW IT Report—Preliminary", May 12, 1993, pp. 8.1-1 thru 8.1-6.

* cited by examiner

Primary Examiner — Paul R Myers
Assistant Examiner — Jeremy S Cerullo
(74) Attorney, Agent, or Firm — Fogg & Powers LLC

(57) ABSTRACT

A method for operating a communications bus between a first computer and a second computer is provided. The method comprising monitoring a receiver bus coupled to the first computer for activity and confirming that the communications are determinant. The communications are confirmed by receiving a control label on the receiver bus and acknowledging to the second computer through a transmitter bus coupled to the first computer that communications are determinant. The method also comprises enabling the second computer to access data accessible by the first computer when the reliability of communications is confirmed.

20 Claims, 3 Drawing Sheets

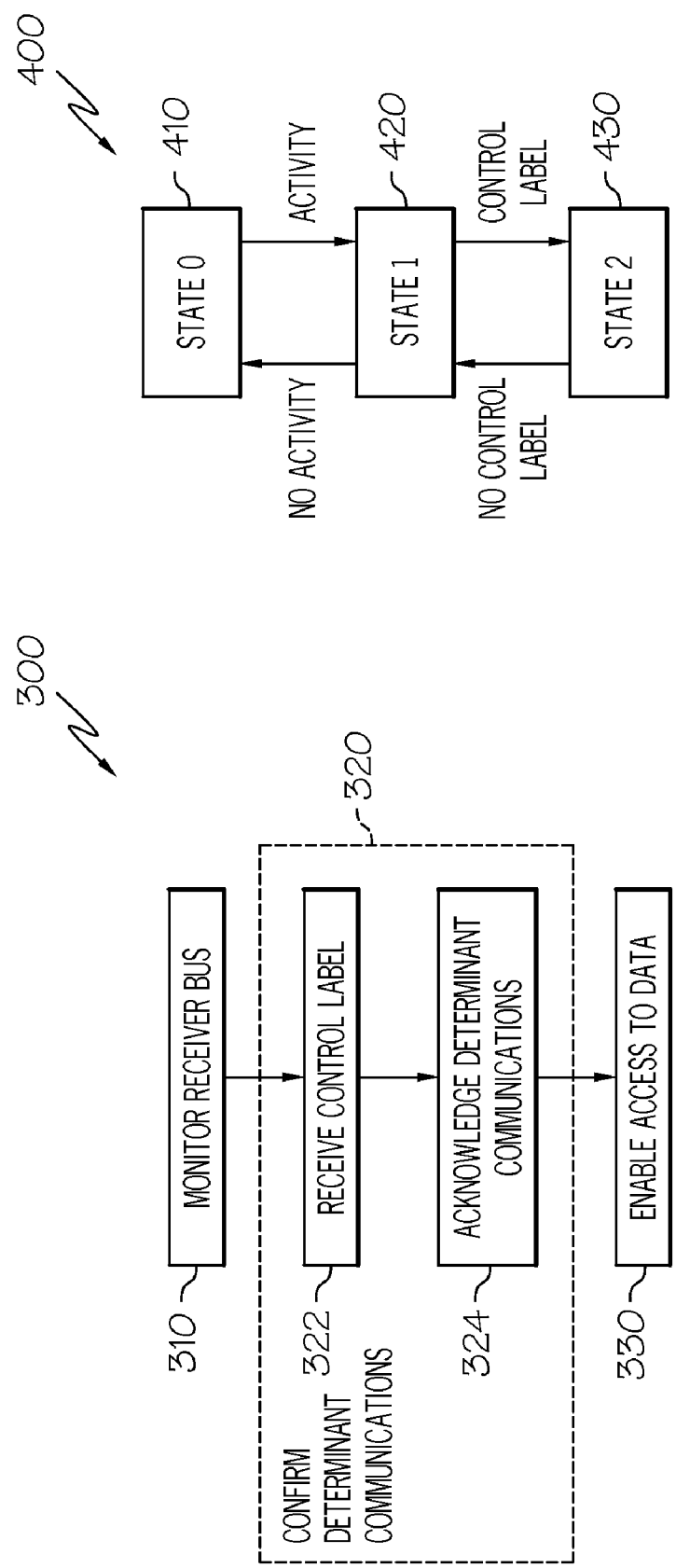

BUS PROTOCOL FOR CONTROL OF COMMUNICATIONS BETWEEN TWO COMPUTERS

BACKGROUND

Computers onboard aircraft contain sensitive data pertaining to characteristics of the aircraft, such as gross weight and center of gravity. The accuracy of this data is essential to a successful flight. Typically, the uploading of this data includes a user interface that is labor-intensive and prone to human error in data entry. These factors introduce both expense in terms of labor time and risk of unintended data entry, any combination of which corrupts data used to compute vital airplane parameters. Exposing the onboard aircraft data storage to ease-of-use data entry systems can improve the expense factor but significantly increases the risk of having incorrect data if not properly controlled and maintained. Typical user and computer interfaces are described as open loop, whereby data can be altered without rigor, control, or traceable history. Errors can be unwittingly, or even intentionally, introduced.

SUMMARY

One embodiment comprises a method for operating a communications bus between a first computer and a second computer. The method comprises monitoring a receiver bus coupled to the first computer for activity and confirming that the communications are determinant. The confirmation comprises receiving a control label on the receiver bus and acknowledging to the second computer through a transmitter bus coupled to the first computer that communications are determinant. The method also comprises enabling the second computer to access data accessible by the first computer when the communications are confirmed determinant.

Another embodiment is directed to a communication system for an aircraft to communicate externally. The system comprises an avionics computer onboard the aircraft and a first ARINC 429 receiver interface coupled to the avionics computer. The avionics computer enters into an alteration mode upon receipt of a control label through the first ARINC 429 receiver interface and the alteration mode enables sensitive data accessible by the avionics computer to be altered.

Another embodiment is directed to a program product for an avionics computer to communicate with a user computer over a data bus using an ARINC 429 standard. The program product comprises a processor readable medium on which program instructions are embodied. The program instructions are operable, when executed by at least one programmable processor included in the avionics computer, to cause the avionics computer to confirm that communications are determinant when a control label is received on a receiver bus, wherein the control label is a three bit octal label in the range of 300 to 377. When the communications are confirmed to be determinant, the program instructions are also operable to enable the user computer to access one or more data structures accessible by the avionics computer.

The details of various embodiments of the claimed invention are set forth in the accompanying drawings and the description below. Other features and advantages will become apparent from the description, the drawings, and the claims.

DRAWINGS

FIG. 3 is a flowchart of one embodiment of a method for operating a communications bus.

FIG. 4 is a state diagram of one embodiment of a process for switching between communication states implemented within a computer environment.

Like reference numbers and designations in the various drawings indicate like elements.

DETAILED DESCRIPTION

Figure 1:
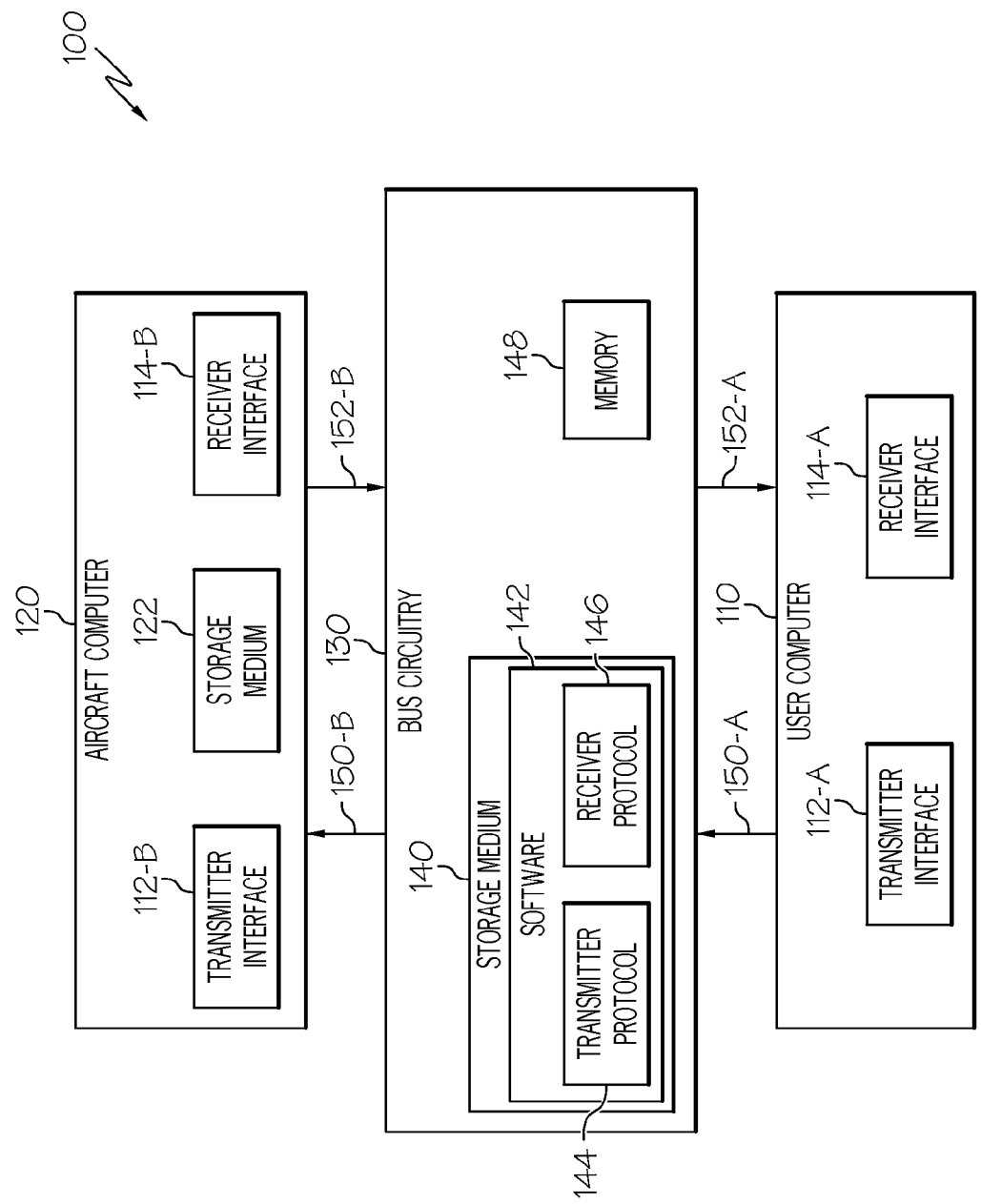
FIG. 1 is a block diagram of one embodiment of bus circuitry used to couple a user computer with an aircraft computer.

FIG. 1 is a block diagram of one embodiment of bus circuitry 130 used to couple a user computer 110 with an aircraft computer 120. This coupling creates a closed loop communication system 100. In a closed loop communication system 100 there is no data transfer allowed exterior to the loop (meaning no data inside the loop can get outside and no data outside the loop can get inside). The closed loop communication system 100 comprises the user computer 110, a receiver bus 150, the aircraft computer 120, and a transmitter bus 152. The user computer 110 is used for providing characterization data to the aircraft computer 120. The user computer 110 is described as a separate computer for simplicity; however, a user could provide characterization data via any user interface through the aircraft computer 120. The aircraft computer 120 comprises a storage medium 122 for storing the characterization data and data corresponding to the characterization data. As used herein, characterization data is any data that corresponds to aircraft specifications, knowledge data, or operation data, including sensitive data, and results from the characterization data (for example, gross weight or center of gravity). Characterization data is discussed throughout this specification as an exemplary type of data that can be altered using the system 100. However, any data stored on the storage medium 122 may be changed using the closed loop communication system 100. For example, an airplane technician uses the user computer 110 to store data on the storage medium 122 relating to tests run by test equipment or data pertaining to vital airplane parameters such as gross weight and center of gravity.

The user computer 110 comprises a transmitter interface 112-A and a receiver interface 114-A. Likewise, the aircraft computer 120 comprises a transmitter interface 112-B and a receiver interface 114-B. The transmitter interfaces 112 and the receiver interfaces 114 enable the aircraft computer 120 and the user computer 110 to connect via the bus circuitry 130. The bus circuitry 130 comprises a storage medium 140 in which software 142 is stored. The software 142 comprises a transmitter protocol 144 and a receiver protocol 146. A protocol is a convention or standard that controls or enables the connection, communication, and data transfer between computing endpoints. Here, the computing endpoints are the user computer 110 and the aircraft computer 120. These protocols are discussed in further detail below.

The receiver bus 150 is a data bus that connects to the transmitter interface 112-A in the user computer 110 and to the transmitter interface 112-B in the aircraft computer 120. The receiver bus 150 is a calibration input bus (CIB) and is used for providing data from the user computer 110 to the aircraft computer 120 (referred to herein as the receiving side). The data bus 150 is dedicated to just one user (that is, the aircraft computer 160). As shown in FIG. 1, the CIB 150 is broken into two sections, 150-A and 150-B. However, this separation is intended to illustrate the bus circuitry 130, and it is to be understood that a single data bus connection or a plurality of data bus connections can be used to couple the user computer 110 with the aircraft computer 120. Data is provided from the aircraft computer 120 to the user computer 110 through the transmitter bus 152 (referred to herein as the transmitting side). The transmitter bus 152 is a flight test bus (FTB). Like the CIB 150, the flight test bus 152 is shown separated into 152-A and 152-B, but can be a single data bus 152.

In the embodiment of FIG. 1, the transmitter protocol 144 and the receiver protocol 146 are implemented in software 142 that is executed by the bus circuitry 130. However, the transmitter protocol 144 and the receiver protocol 146 can be implemented on software stored in each computing endpoint (that is, the user computer 110 and the aircraft computer 120). The software 142 comprises program instructions that are stored on a suitable storage device or medium 140. Suitable storage devices or media 140 (similarly, for storage medium 122) include, for example, forms of non-volatile memory, including by way of example, semiconductor memory devices (such as Erasable Programmable Read-Only Memory (EPROM), Electrically Erasable Programmable Read-Only Memory (EEPROM), and flash memory devices), magnetic disks (such as local hard disks and removable disks), and optical disks (such as Compact Disk-Read Only Memory (CD-ROM) disks). Moreover, the storage device or media 140 need not be local to the bus circuitry 130. Typically, a portion of the software 142 executed by the bus circuitry 130 and one or more data structures used by the software 142 during execution are stored in a memory 148.

FIG. 1 shows the storage medium 122 located internally to the aircraft computer 120. However, in other embodiments, the storage medium 122 is located external to the aircraft computer 120. The components of the communication system 100 are communicatively coupled to one another as needed using suitable interfaces and interconnects.

Figure 2:
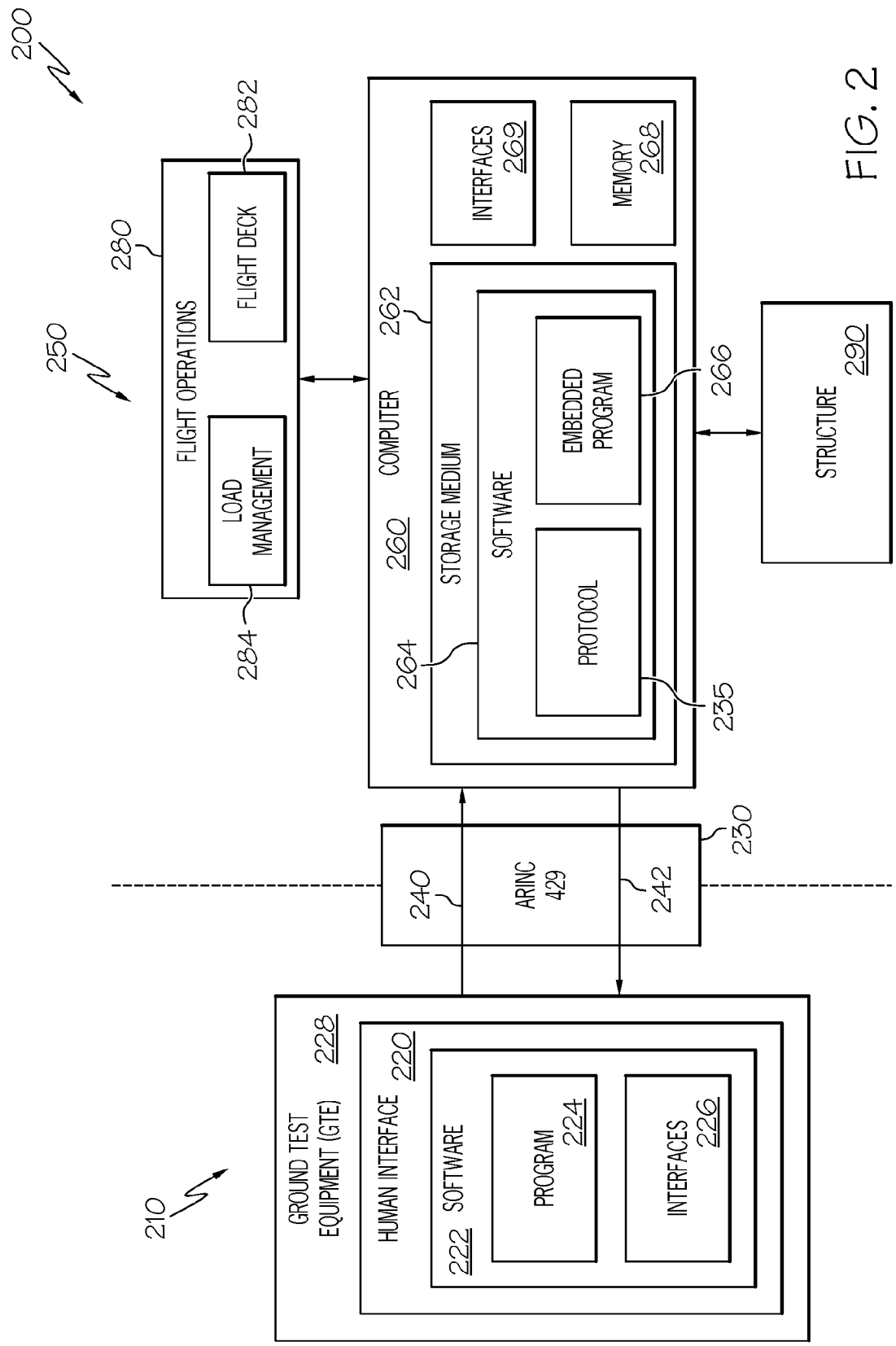
FIG. 2 is a block diagram of one embodiment of a closed-loop communication system between a ground-use environment and an end-use environment.

FIG. 2 is a block diagram of one embodiment of a closed-loop communication system 200 between a ground-use environment 210 and an end-use environment 250. The ground-use environment 210 corresponds to the user side of the closed-loop communication system 200. The end-use environment 250 corresponds to the avionics side of the closed-loop communication system 200, including other systems on-board an aircraft. The ground-use environment 210 and an end-use environment 250 are linked through data busses 240 and 242. The data bus 240 is a CIB and is considered the receiver bus. The data bus 242 is a FTB and is considered the transmitter bus. The data busses 240 and 242 are shown as one continuous bus, however it is to be understood that the data busses can comprise multiple busses. The data busses 240 and 242 are both dedicated to a protocol 235. The protocol 235 is a unique protocol that utilizes existing communication circuitry by which an onboard computer 260 communicates externally.

The human interface 220 is coupled to ground test equipment (GTE) 228. A human interface 220 enables a user to control access to data stored on the computer 260. The human interface 220 comprises software 222 configured to execute the program 224. In one embodiment, the program 224 is an object oriented program which executes the protocol 235. Embodiments of the human interface 220 include a laptop or notebook computer with either a closed operating system like MS-Windows or an open operating system like Linux, or any other suitable computer system.

Characterization data is stored in the memory 268, which is accessible by the computer 260. Additionally, sensor and environmental data is stored on the memory 268, as well as historical data relating to the aircraft's past. The memory 268 comprises, in one implementation of such an embodiment, any suitable form of random access memory (RAM) now known or later developed, such as dynamic random access memory (DRAM). In other embodiments, other types of memory are used. In other embodiments, the memory 268 is located externally to the computer 260.

The structure 290 provides sensor data to the computer 260. The structure 290 comprises any number of components or sensors on the aircraft, and could even be its own environment. For example, the structure 290 is the landing gear structure of the aircraft.

The computer 260 provides end-use data to the flight operations 280 (such as results of the characterization data). The flight operations 280 comprises a flight deck 282 and a load management 284. The load management 284 is responsible for loading the aircraft, including fueling. Results from the characterization data (that is, data relating to the sensitive data) are provided to the load management 284, where a user determines how to load the aircraft based on results from the characterization data. The flight deck 282 contains flight instruments that provide data to a user (for example, a pilot). Results from the characterization data stored in the memory 268 can also be displayed to the pilot. The pilot can use this information as a final verification to ensure the end-use data (that is, results from the characterization data such as gross weight and center of gravity) is within a range of expected or safe values.

In the embodiment of FIG. 2, the data busses 240 and 242 use the ARINC 429 transmitter and receiver circuits and drivers (referred to herein as ARINC 429) 230. ARINC 429 is an avionics industry standard that defines a local area network for transfer of digital data between avionics system elements. In other words, ARINC 429 is a specification that describes how an avionics system provides information over single twisted pair wires (a data bus) to other system elements having need of that data. Bi-directional data flow on a given data bus is not permitted. Words transmitted by ARINC 429 are 32 bits long including a label and a parity bit. The label is an eight bit field that identifies the type of information contained in the word. Two bits comprise a sign/status matrix (SSM) used to indicate whether the data in the word is valid. The ARINC 429 protocol layer also includes specifications relating to total bit lengths, refresh frequencies, source and destination identifiers, and minimum bit separation intervals.

However, the ARINC 429 and its corresponding user and computer interfaces has an open architecture. Data can be altered without control or a traceable history, leading to a high risk of error. A closed-loop interface between the human interface 220 and the onboard computer 260 would solve the problem of the characterization data being introduced with errors, as well as increase the efficiency of data entry. Without the protocol 235, the ground-use environment 210 is an open-loop. However, when the GTE 228 connects with the avionics computer 260 using the protocol 235, the communications become closed (that is, closed-loop) and determinant.

The computer 260 comprises a storage medium 262 in which software 264 is stored. The software 264 comprises the protocol 235. In the exemplary embodiment of FIG. 2, the protocol 235 utilizes the existing communication circuitry of the ARINC 429 circuitry 230. Thus, the ARINC 429 bus hardware is utilized to establish and maintain two-way communication between a user and the software 264 in the computer 260 within a closed-loop system using the protocol 235. The protocol 235 is used to establish, maintain, and control sensitive data (that is, airplane characterization data) in a closed-loop communication between the avionics and the ground test equipment. One method for using the protocol 235 is provided in FIG. 3.

FIG. 3 is a flowchart of one embodiment of a method 300 for operating a communications bus. The communications bus is responsive to a protocol stored on a first and a second computer coupled to the communications bus, which comprises a receiver bus and a transmitter bus. The method 300 begins with monitoring a receiver bus coupled to a first computer for activity (310). Once activity is detected by the first computer over the receiver bus that is indicated as valid (through a handshake mechanism), the communications are confirmed to be determinant (320). In one embodiment, the control labels used to confirm that communications are valid are the SSM sequences (two predefined bits in every ARINC 429 communication corresponding to normal operations (NO), non-computed data (NCD), fail warning (FW), and functional test (FT)). Confirming that the communications are determinant (320) comprises receiving a control label (322) and also acknowledging that the communications are determinant (324). Also, the control label is used for acknowledging to a second computer through a transmitter bus coupled to the first computer that the communications are determinant (324). The acknowledgement is done by transmitting the control label back to the second computer using SSM sequences to indicate successes and failures as appropriate.

Once communications are confirmed determinant, the method 300 comprises enabling the second computer to access one or more data structures which are accessible by the first computer (330). The second computer is also enabled to alter the one or more data structures. If a user has previously altered data stored in one of the data structures, data pertaining to that data structure is implanted from the second computer (that is, the user computer) into the first computer (that is, the avionics computer).

In one embodiment, the communications bus is used with the protocol 235 which conforms to the ARINC 429 standards. For illustrative purposes, the protocol 235 is explicitly described for functionality with the ARINC 429 standard. Therefore, the protocol 235 is designed to be backwards compatible with ARINC 429 standards. However, ARINC 429 is just one example of bus hardware the protocol 235 can be used with. The protocol 235 can be configured to apply to any other bus hardware.

The protocol 235 is unique in its use of data formats and bit combinations which is compatible with an embedded program 266 onboard the avionics computer 260. The protocol 235 serves as a dedicated software application layer on top of the ARINC 429 protocol layer which itself is applied on the physical layer forming the transmit and receive communication circuitry 230. The ARINC 429 standard requires labels to be 8-bit, 3 octal digits. In this case, the control label is a three bit octal label in the range of 300 to 377. Therefore, the protocol 235 secures access to the data structures accessible by the avionics computer by controlling transmission of data in a methodology that compresses, staggers, or otherwise fits data exceeding the normal capacity of ARINC 429 into its physical layer transmission standards.

An exemplary avionics application for which the protocol 235 provides value is the Weight and Balance System (WBS) from Honeywell International, Inc. (herein after referred to as "Honeywell"). For purposes of illustration, the protocol 235 is discussed in terms of using the Weight and Balance System, however it is understood that the protocol 235 applies to other structural systems, such as the 777 air/ground indication system (including the primary function Weight on Wheels), also available from Honeywell. The WBS measures aircraft gross weight and center of gravity (corresponding to weight distribution) using sensors mounted on the aircraft landing gear. The WBS acts like a real-time set of scales and can also acts as a check for a pilot. The pilot would compare the weight from the WBS to a manifest containing weights of the aircraft empty, loaded, or fueled. If the data reconciles, the crew is confident that the aircraft is safely loaded.

The WBS is data intensive and requires characterization of landing gear sensor data to accurately compute the forces passing through the aircraft's structures into results of the characterization data (such as weight components). Characterization involves determining a profile of a structure (such as a beam system for a WBS) corresponding to characteristics of that particular structure. The characterized data must also be uploaded from the ground-use environment 210 to the end-use environment 250. Without the protocol 235, uploading of this characterization data requires a user interface that is labor-intensive and prone to human error in data entry, introducing both expense in terms of time and risk of inaccurate data entry, any combination of which corrupts data used to compute the vital aircraft parameters of gross weight and center of gravity. However, with the protocol 235, these risk factors and labor costs are decreased.

The protocol 235 has at least two features that are implemented for the WBS in at least two environments and three phases. A first feature provides an intelligent structure by which both expense and the risk factor of inaccurate data are reduced through a handshake mechanism (that is, receipt of the control label and a validity check). The handshake mechanism must be known by each end of the system 200 (that is, the ground-use environment 210 must handshake with the end-use environment 250) before data in the end-use environment 250 can be altered. A second feature provides an intelligent structure by which all data used by the avionics applications are accessible within the capacity of ARINC 429.

A first environment the protocol 235 is utilized in is the end-use environment 250 comprising the embedded program 266 within the onboard system. For example, the computer 260 comprises a Weight and Balance Computer (WBC) for a WBS. The WBC 260 comprises the embedded software 266 running the protocol 235. A second environment the protocol 235 is used in is the ground use environment 210 comprising the human interface 220, which comprises a computer platform configured to execute the software program 224. The first and second environments also comprise a physical layer of the ARINC 429 standard transmitter and receiver interfaces 269 and 226, respectively.

The protocol 235 works in at least three phases, Phase 1, 2, and 3. Phase 1 is the handshake phase, during which the reliability of communication between the two environments 210 and 250 is proven. Because the protocol 235 defines specific labels with unique data bit definitions, these uses, in specific combinations, allow data sensitive to gross weight and center of gravity accuracy to be altered only through a knowledge-based user interface. "Knowledge-based" as used herein is defined to mean that the protocol rules must be implemented by both the on-aircraft computer 260 embedded program 266 and by ground support equipment (comprising the human interface 220), to correctly establish hardware and software links and handshakes before sensitive data can be altered. Phase 2 is an access phase, during which the busses transfer data from the end-use environment 250 to a user in the ground-use environment 210. Phase 3 is an efficiency phase implemented when a user had previously accessed (and often corrupted) data within the end-use environment 250

(the onboard system). During phase 3, all the previously accessed data is implemented within the ground-use environment 210 (the user system).

Additionally, when the protocol 235 is used in conjunction with the Weight and Balance System (WBS), the protocol 235 preserves the WBS's state machine which comprises a first state (state 0) and a second state (state 1) used by the WBS. State 0 is a steady state in which the onboard avionics computer 260 operates in upon initial power up and is also reached when no activity is sensed on the ARINC 429 receiver bus 240 dedicated to the protocol 235. In state 0, the ARINC 429 transmitter bus 242 dedicated to the protocol 235 (known as the "Flight Test Bus" in the WBS example) operates in a single mode of data, repeated on an interval defined by the WBS. State 0 allows for test equipment to monitor the receiver bus 240, outside the control of this user protocol. State 0 cannot change or otherwise alter any WBS data. State 1 has an open architecture, where (without the protocol 235) data could be altered without rigor, control, or a traceable history. State 2 functions as a closed loop, where the reliability of the communications are confirmed (or authority is confirmed) before data can be altered.

FIG. 4 is a state diagram 400 of one embodiment of a process for switching between communication states implemented within a computer environment. The computer environment can be the ground-use environment 210 or the end-use environment 250. For illustrative purposes only and not by way of limitation, FIG. 4 is discussed in terms of an embodiment where the computer environment is a weight and balance system (WBS). State 0 (410) is a first state and is the default state when no activity is sensed on a receiver bus. When activity is sensed on the receiver bus, State 0 switches to a second state, State 1 (420). Activity on the bus that never includes any label in the range of 300 to 377 will therefore remain the state machine in State 1. Within State 1, a Honeywell application known as WBSCAL will run within a semi-open architecture. WBSCAL is a program used for characterizing aircraft data (such as the landing gear sensor data). In one embodiment, WBSCAL is installed on a device separate from the computer 260 and reads data from the transmit bus 242.

A third state, State 2 (430), is entered from State 1 (420) while activity is sensed on the bus, a dedicated label is read and the communications are valid (420). For the WBS using the ARINC 429 standard, the dedicated label is in the octal range of 300 to 377. This dedicated label is referred to as a control label. The control label is used to command the avionics computer into a sub-state of State 2 (430) that the user needs for the expected data and usage. The control label is also used to acknowledge the sub-state from the avionics computer back to the user. The control label further encodes optional user details to affect the data outcome from the avionics computer. The optional user details are assigned other labels within the octal range of 300 to 377. Some examples of optional user details are given in Tables 1 and 2 below.

When activity is sensed on the bus and the control label is not sensed, the communications system reverts to state 1 (420). The communications system reverts to state 0 (410) when activity is no longer sensed on the bus.

One exemplary protocol that comprises these standards and control label for the WBS is provided in Table 1. The state the system is currently in corresponds to the column "State Number." The state that is switched to is listed in the "State (new value)" column, and corresponds to States 0, 1, and 2, with sub-states for State 2 comprising States 2.1 through 2.4. The "Purpose" column indicates the function of the communication system, for example, recording flight test information, running WBSCAL, or operating with ground test equipment (GTE). Label {300} refers to any label in the octal range of 300 to 377. These labels can be assigned various meanings in the protocol 235. Also, data packets can be assigned labels within the 300 to 377 octal range that have differing effects.

Some rows of Table 1 are explicitly discussed for clarification. For example, the fourth row corresponds to when the system is in state 1 (standby) and a label {300} is detected. Detecting the label {300} implies that the label has been received (in other words, new data has come in) and the data is valid. The label {300} is valid, for example, if the label {300} is accompanied by a normal operation (NO) value for the SSM). If the label {300} is received on the bus but is not valid, the system remains in the previous state. Because a label {300} is detected, the system enters State 2. State 2.1 is entered (see row 5) when a label {300} is detected, and the packet assignment for label {300} is calibration. Thus, the system enters state 2.1, in which the system is calibrated. Other sub-states of State 2 include registration (2.2), fault history (2.3) and user mode control (2.4). The sub-states of State 2 indicate which type of data is to be altered. Once there is not a valid label {300} on the receiver bus (corresponding to row 9), the system reverts to State 1. Similarly, for row 10, if there is a valid label {300} but the sign/status matrix gives a fail warning, the system reverts to State 1. The system will remain in its previous state if the label {300} is received with a NCD or FT SSM.

TABLE 1

| State Number | State (past value) | Purpose | Condition | State (new value) |
|---|---|---|---|---|
| 0 | Default | Flight Test Recording | No activity on CIB | 0 |
| 0 | Default | | Activity on CIB | 1 |
| 1 | Standby | WBSCAL | Label {300} not found | 1 |
| 1 | Standby | | Label {300} valid | 2 |
| 2 | Protocol | GTE | Label {300} valid AND Label {300} SSM = NO AND Label {300} packet assignment = calibration | 2.1 |
| 2 | Protocol | GTE | Label {300} valid AND Label {300} SSM = NO AND Label {300} packet assignment = Register | 2.2 |
| 2 | Protocol | GTE | Label {300} valid AND Label {300} SSM = NO AND Label {300} packet assignment = Fault history | 2.3 |

TABLE 1-continued

| State Number | State (past value) | Purpose | Condition | State (new value) |
|---|---|---|---|---|
| 2 | Protocol | GTE | Label {300} valid AND Label {300} SSM = NO AND Label {300} packet assignment = user mode control | 2.4 |
| 2 | Protocol | GTE | Label {300} NOT valid | 1 |
| 2 | Protocol | GTE | Label {300} Valid AND Label {300} SSM = FW | 1 |
| 2 | Protocol | GTE | No activity on CIB | 0 |

More specific topics and their corresponding protocol assignments and effects for the WBS conforming to the ARINC 429 standards are provided in Table 2. It is to be understood that these topics are given by way of example and not by way of limitation.

TABLE 2

| Topic | Protocol Assignment | Effect |
|---|---|---|
| a | Backward compatible with WBSCAL for existing users | |
| b | Introduces labels {300} previously unused | |
| c | CIB label {300} controls the protocol | |
| d | CIB label {301-305} provides detailed user commands in a format as indicated by label {300}. | {301} indicates binary, {302} indicates discrete, and {303-305} indicate binary coded decimal. |
| e | FTB label {307} AND CIB label {307} indicate the relative health of the packets transmitted on the other bus | |
| f | CIB label {300, 301} are reflected back to user via the FTB | |
| g | FTB {300} SMM = Non-Computed Data (NCD) | Indicates WBC has received a new command via CIB {300} and will not recognize new CIB {300} command until FTB {300} = Normal Operations (NO) or Fail Warning (FW) |
| h | CIB {300} SMM = Functional Test (FT) | Initiates handshake test with the WBC. FTB {300} SMM = FT acknowledges CIB {300} and remains in FT until CIB {300} SSM = NCD |
| i | CIB {300} SMM = NCD | Acknowledges WBC handshake via FTB {300} and commands WBC FTB to move into a state that is ready to operate in GTE Modes. WBC is ready when FTB Labels revert SSM = NO |
| j | CIB {300} SMM = Fail Warning (FW) | Commands WBC to reset FTB activity to Standby (State 1) |
| k | CIB transmits new or changed data packet n to write into Weight and Balance Computer (WBC) calibration mode, including checksum of packet n | WBC FTB responds with corresponding data packet n labels SMM = NCD while checksum is computed. If packet checksum ≠ CIB packet checksum, then packet n labels SSM = FW, else WBC packet n = CIB packet n AND WBC/CM protocol resumes with write packet to CM. If CM fault occurs, then FTB packet n labels revert to existing (unchanged) values and SSM = NO. If no CM fault occurs, then FTB packet n labels transmit new values, as saved by the CM, and SSM = NO. |
| l | FTB {300} SMM = FW indicates a failure in WBC that can be viewed via labels {350, 351, 352} while in Ground Test Equipment (GTE) Modes | Remains in this steady state until CIB Label {300} action is taken. CIB {300} SSM = FW will reset the FTB activity to Standby (State 1) |
| m | CIB {300} indicates a packet assignment while in GTE Mode | |
| m.1 | Packet assignment design allows for a pattern to repeat every 20 cycles | |

TABLE 2-continued

| Topic | Protocol Assignment | Effect |
|---|---|---|
| m.2 | Packet assignment that does not require a full 20 cycles may repeat on a shorter cycle, with rules | Initial state of every packet MUST align on a 20 cycle boundary. Recommended that packets requiring less than 20 cycles to complete should select designs that repeat on factors of 20 (for example, 4 cycles, 5 cycles, or 10 cycles). |

In sum for the embodiment discussed above, ARINC 429 bus hardware is utilized to establish and maintain two-way communication between a user and embedded software program onboard an aircraft within a closed-loop system. Both receiver and transmitter busses are dedicated to the protocol to maintain data integrity of sensitive characterization data between Honeywell's sensor and the aircraft environment with which it interfaces to provide the key parameters to the end user for which the onboard avionics is designed. Data altered by a user such as gross weight or center of gravity has a very low risk of inaccuracy from data errors when the protocol described above is implemented.

A number of embodiments of the invention defined by the following claims have been described. Aspects described with respect to a particular embodiment may be combined with, or replace aspects of, other embodiments. Nevertheless, it will be understood that various modifications to the described embodiments may be made without departing from the scope of the claimed invention. For example, although the protocol is described above in connection with embodiments in which the ARINC 429 standards are preserved and Honeywell's WBS is implemented, the protocol can be used with other bus hardware or ground test equipment system. Likewise, the protocol can be implemented in other avionics systems besides WBS to work with the same ground test equipment, for example, the 777 air/ground indication system with the weight on wheels function. Accordingly, other embodiments are within the scope of the following claims.

What is claimed is:

1. A method for operating a communications bus between a first computer and a second computer, the method comprising:
   monitoring a receiver bus coupled to the first computer for activity;
   confirming that communications are determinant, the confirmation comprising:
      receiving a control label on the receiver bus, wherein the receiver bus conforms to ARINC 429 standards and the control label is a three bit octal label; and
      if the control label is within a predefined range, acknowledging to the second computer through a transmitter bus coupled to the first computer that communications are determinant; and
   enabling the second computer to access data accessible by the first computer when the communications are confirmed determinant.

2. The method of claim 1, further comprising when the communications are confirmed to be determinant, enabling the second computer to alter the data accessible by the first computer.

3. The method of claim 1, wherein:
   confirming that communications are determinant further comprises entering a second state from a first state when activity is detected over the receiver bus; and
   enabling the second computer to access data accessible by the first computer further comprises entering a third state from the second state when the control label is detected over the receiver bus.

4. The method of claim 3, further comprising reverting to the first state when activity is no longer detected over the receiver bus.

5. The method of claim 3, further comprising:
   wherein the control label directs the first computer into one of a plurality of sub-states of the third state, wherein the plurality sub-states are each associated with a particular type of data; and
   wherein the first computer acknowledges to the second computer that the one of a plurality of sub-states is entered.

6. The method of claim 1, wherein:
   predefined range is the range of 300 to 377.

7. The method of claim 1, wherein enabling the second computer to access one or more data structures further comprises implanting data from the second computer into at least one data structure accessible by the first computer when a user has previously altered the at least one data structure.

8. A communication system for an aircraft to communicate externally, the system comprising:
   an avionics computer onboard the aircraft;
   a first ARINC 429 receiver interface coupled to the avionics computer;
   wherein the avionics computer enters into an alteration mode upon receipt of a control label within a dedicated range through the first ARINC 429 receiver interface; and
   wherein the alteration mode enables sensitive data accessible by the avionics computer to be altered.

9. The communication system of claim 8, wherein the avionics computer functions in a plurality of different states, the states including:
   a first state for when no activity is sensed through the first ARINC 429 receiver interface;
   a second state for when activity is sensed through the first ARINC 429 receiver interface and the control label is not read; and
   a third state for when activity is sensed on the bus and the control label is read, wherein the third state enables the alteration mode.

10. The communication system of claim 8, wherein the alteration mode allows gross weight and center of gravity of the aircraft to be changed.

11. The communication system of claim 8, wherein the avionics computer enters into the alteration mode upon receipt of a control label that is an octal label in the range of 300 to 377.

12. The communication system of claim 8, further comprising a first ARINC 429 transmitter interface coupled to the avionics computer.

13. The communication system of claim 12, further comprising:

a user computer configured to couple to ground test equipment;

a second ARINC 429 receiver interface coupled to the user computer, wherein a first data bus is coupled to the second ARINC 429 receiver interface and the first ARINC 429 transmitter interface; and a second ARINC 429 transmitter interface coupled to the user computer, wherein a second data bus is coupled to the second ARINC 429 transmitter interface and the first ARINC 429 receiver interface.

14. The communication system of claim 8, further comprising:

a load management, wherein data relating to the sensitive data is displayed; and a flight deck, wherein data relating to the sensitive data is displayed.

15. A program product for an avionics computer to communicate with a user computer over a data bus using a ARINC 429 standard, the program product comprising a non-transitory processor readable medium on which program instructions are embodied, wherein the program instructions are operable, when executed by at least one programmable processor included in the avionics computer, to cause the avionics computer to:

confirm that communications are determinant based on a value of a control label received on a receiver bus, wherein communications are confirmed as determinant if the control label is a three bit octal label in the range of 300 to 377; and when the communications are confirmed to be determinant, enable the user computer to access one or more data structures accessible by the avionics computer.

16. The program product of claim 15, wherein when the communications are confirmed to be determinant further comprises enable the user computer to alter one or more data structures.

17. The program product of claim 15, further comprising monitor for activity on the receiver bus.

18. The program product of claim 17, wherein:

confirm that communications are determinant further comprises enter a second state from a first state when activity is sensed over the receiver bus; and enable the user computer to access data accessible by the avionics computer further comprises enter a third state from the second state when the control label is sensed over the receiver bus.

19. The program product of claim 18, wherein:

the first state is a steady state in which no activity is sensed on the receiver bus;

the second state is a state wherein the ARINC 429 standards apply; and the third state is an alteration state wherein the one or more data structures are alterable.

20. The program product of claim 15, wherein the control label additionally causes the avionics computer to:

command the avionics computer into a sub-state of the third state; and acknowledge the sub-state of the third state to the user computer through a transmitter bus.

* * * * *